INVENTORS:
WILLIAM A. SELKE
JOHN H. MATHEWS
BY
ATTORNEYS

United States Patent Office 3,385,752
Patented May 28, 1968

3,385,752
DIELECTRIC PAPER OF WOOD FIBERS AND RELATIVELY LARGE DIAMETER RAYON OR POLYVINYL FORMAL FIBERS
William A. Selke, Stockbridge, and John H. Mathews, Lee, Mass., assignors to Kimberly-Clark Corporation, Neenah, Wis., a corporation of Delaware
Filed Jan. 21, 1965, Ser. No. 426,784
3 Claims. (Cl. 162—138)

ABSTRACT OF THE DISCLOSURE

Dielectric paper, for use between capacitor electrodes, consisting of wood pulp fibers and as a bulking agent relatively large-diameter rayon or polyvinyl formal fibers. Latter fibers no more than ¼ inch in length and present in an amount between about 2% and 10% of the dry weight of the paper.

---

Figure 1:
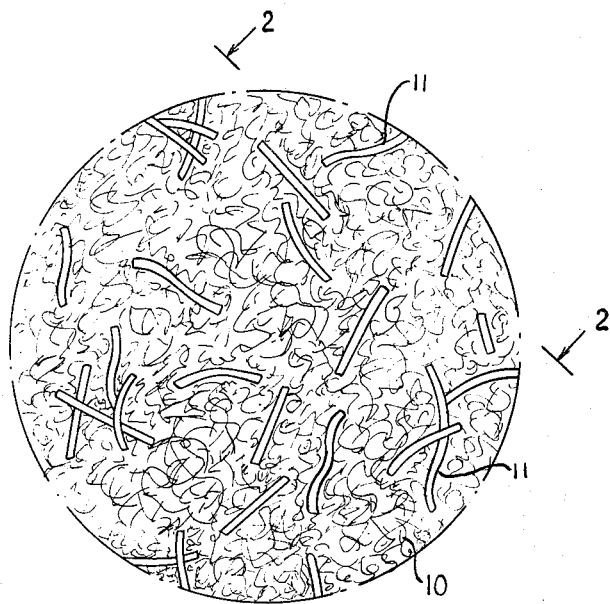

This invention relates generally to papermaking, and has particular reference to an improved capacitor tissue and a method of making it.

As is known, certain types of electrostatic capacitors consist essentially of alternately arranged layers or strips of metallic foil and paper, usually interwound convolutely, the wound bodies being subjected to heat and vacuum and impregnated with a dielectric substance. The paper layers comprise capacitor tissue which should be unusually thin and film-like, preferably composed essentially of highly beaten wood pulp fibers.

It is a general object of the invention to provide an improved capacitor tissue whose use in such a capacitor helps to reduce its dissipation loss or "power factor." A theoretically ideal capacitor has a loss factor of zero. The dissipation which precludes the attainment of this ideal is caused chiefly by the paper interposed between the electrodes.

For many years, capacitor paper having a density of 1.0 gram per cubic centimeter was considered satisfactory for most commercial purposes, usually producing a dielectric in the finished capacitor consisting of about two-thirds paper and one-third impregnant (e.g., hydrocarbon oils, chlorinated aromatics, etc.). To reduce the power factor of the capacitor, it is desirable that the proportion of paper be as small as possible, and therefore more recently papers having densities as low as about 0.70 have been employed more and more. With such a reduction in density the proportion of paper in the dielectric of a capacitor can be diminished to about 50%, with corresponding reduction in power factor.

However, conventional ways of making paper less dense e.g., by less beating of the pulp, result also in making the paper more porous and of lowered dielectric strength. This invention has for its primary objective the provision of capacitor tissues having densities lower than 0.70 while still retaining the desirable qualities of low porosity and high dielectric strength afforded by highly beaten wood pulp stock.

The achievement of this object is predicated upon a departure from conventional methods of lowering paper density, and the employment of a special procedure for increasing the effective bulk of capacitor tissue. Briefly stated, the effective density of the paper is lowered by including with the highly beaten wood pulp a small fraction of short-length fibers having diameters of the same order of magnitude as the nominal thickness of the paper to be produced. These fibers act as a bulking agent and are particularly effective when the capacitor tissue is used in multiple layers. Most capacitors use more than a single sheet of tissue between the electrodes or foils, and many capacitors, notably those used for correction of power-factor losses in inductive primary circuits, have from three to seven sheets of paper between electrodes.

The capacitor tissues to which this invention relates usually have nominal thicknesses of from 0.0004 to 0.0015 inch, although the basic concept of the invention is not necessarily restricted to this range. For paper whose thickness is within the range illustratively specified, the fibers added as a bulking agent will usually have a coarseness of from 1.0 to 15 denier. The preferred fibers have controlled diameter and length, have a hydrophilic surface, and are not thermoplastic over the temperature range encountered in the fabrication and use of the capacitor. Furthermore, the fibers should not have excessive power factor in themselves, and they should have adequate chemical stability to prevent decomposition in service. Rayon fibers are particularly desirable since they fill all these requirements. Polyvinyl formal fibers are also satisfactory. Others having similar qualifications may also be used.

It is important, also, that the added fibers be thoroughly freed of ionic contaminants which might increase the power factor of the paper itself or of the dielectric fluid with which the tissue is to be impregnated. Prior to use, therefore, the fiber employed as an added bulking agent should be freed of such impurities, as by boiling it in deionized water, extraction with organic solvents, or other appropriate treatments. In the case of rayon staple fiber commercially available, there is usually an excessive amount of sodium ion which should be leached out in deionized water. Surface active agents used in the processing of the fiber should also be removed, as by washing with a mixture of alcohol and water.

The added fibers should be of relatively short lengths, advantageously no longer than ¼ inch and preferably in the range between ⅟₁₆ and ⅛ inch. If the fibers are too long they form snarls and lumps and become non-uniformly distributed. Moreover, fibers longer than ¼ inch cannot usually pass through the screen through which the stock flows to the head box of a papermaking machine.

The added fibers are preferably employed in amounts within the range of 2% to 10% of the dry weight of the paper. Quantities less than 2% do not have any appreciable effect upon the sheet density, and when more than 10% of the bulking fibers is used, the sheets are found to suffer in dielectric strength and to approach undesirable degrees of porosity.

The invention makes it possible in simple, low-cost, and commercially-feasible manner to produce capacitor tissues which manifest low porosity and high dielectric strength, and effective densities as low as 0.59 gram per cubic centimeter. The term "density" as used herein is determined by dividing the dry weight per unit area by the thickness of the paper, and the thickness value assigned to capacitor tissue of the kind to which the invention relates is customarily determined by taking one-tenth of the value obtained by measuring the thickness of ten stacked sheets with a micrometer having an anvil diameter of ¼ inch and applied with a pressure of 25 pounds per square inch.

Figure 2:
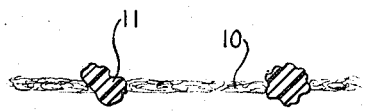

In the accompanying drawing, FIGURE 1 is a microscopically enlarged view of a representative section of capacitor tissue embodying the features of this invention, and FIGURE 2 is a cross-sectional view along the line 2—2 of FIGURE 1.

The fibers 10 are conventional highly beaten wood pulp fibers constituting the chief fibers of which the capacitor tissue is composed. Randomly spaced but uniformly distributed throughout the sheet are the added fibers 11 whose diameters are of the order of the nominal thickness of the sheet itself. The fibers 11 serve as a bulking agent when the sheet is interposed between the electrodes of a capacitor because they resist the compressive forces that tend to reduce the thickness of the sheet. This bulking effect is particularly effective when two or more of the sheets are used in superposed relation.

In carrying out the invention, an aqueous suspension of highly beaten wood pulp fibers is first formed in accordance with usual papermaking techniques; and a separate suspension is provided, in deionized water, of the relatively large-diameter fibers, thoroughly freed of ionic contaminants. The suspensions are mixed, as by feeding the spearate suspension into the headbox of a Fourdrinier papermaking machine, and a paper web is then formed by conventional papermaking techniques. The suspensions are mixed in such proportions that the large-diameter fibers constitute from 2% to 10% of the dry weight of the resultant tissue, and are randomly uniformly distributed throughout the sheet. The papermaking process causes them naturally to assume dispositions substantially along the plane of the sheet so that their lateral surfaces, rather than their cut ends, lie along the opposite surfaces of the sheet as indicated in FIGURE 2.

For capacitor tissue in the thickness range with which this invention is primarily concerned, viz, from about 0.4 mil to about 1.5 mils, the large-diameter fibers will be chosen to have a coarseness of from 1.0 to 15 denier. As is known, "denier" is the weight in grams of a 9,000-meter length of the fiber. The relationship of fiber diameter to denier involves the specific gravity of the fiber and also its cross-sectional shape. For example, a rayon fiber of 2 denier coarseness has a diameter of about 0.0005 inch; while a 15-denier rayon fiber has a diameter of about 0.0016 inch.

The general nature and effectiveness of the invention are illustratively set forth in the following examples.

EXAMPLE I

As a standard of comparison, capacitor tissue having a sheet thickness of 0.00056 inch was made of highly beaten wood pulp stock in accordance with usual procedures. The density (grams per cubic centimeter) was found to be 0.71 and the dielectric strength (volts per mil) 495. The dielectric strength was determined by the method set forth in ASTM D-202.

EXAMPLE Ia

To the stock used in Example I, rayon fibers were added in an amount equal to 6% by weight (dry). Prior to use, the rayon fibers were deionized and purified. The rayon used was 3-denier pre-cut to a length of 1/16 inch. The resultant tissue had a thickness of 0.00066, a lowered density of 0.59, and a dielectric strength of 507.

EXAMPLE Ib

The procedure of Example Ia was carried out, using the same amount of polyvinyl formal fiber cut to the same length and of substantially 2-denier coarseness. The resultant paper had a thickness of 0.00066, a density of 0.60, and a dielectric strength of 483.

EXAMPLE II

Again, as a standard of comparison, capacitor tissue was made by usual techniques, the tissue having a thickness of 0.00065 and a density of 0.73.

EXAMPLE IIa

To the wood pulp stock of Example II, rayon fibers were added in an amount equal to 2%, by (dry) weight. Prior to use the fibers were purified, and dispersed in deionized water. They were added to the main stock ahead of the head box screen. The fibers were 5.5-denier, cut to 1/8 inch lengths. The resultant tissue had a thickness of 0.00066 and a density of 0.69.

EXAMPLE IIb

The procedure of Example IIa was carried out, using 5% of the rayon fibers instead of 2%. The tissue produced had a thickness of 0.00072 and a density of only 0.64.

EXAMPLE III

To test for, and compare, power factor of dry tissues, determined by the method set forth in ASTM D150-59T, a capacitor tissue was formed of wood pulp and manifested a thickness of 0.00066, and a density of 0.76. Similar tissues were made, with addition of 4% by weight, of rayon fibers in one case and 6.5% in the other. The rayon used was pre-washed in alcohol and deionized water, and it was 5.5-denier cut to 1/16 inch lengths. The results were as follows:

| Sample | Density | Power factor (percent) | | |
|---|---|---|---|---|
| | | 40° C. | 100° C. | 120° C. |
| No rayon | 0.76 | 0.087 | 0.083 | 0.103 |
| 4% rayon | 0.67 | 0.076 | 0.075 | 0.091 |
| 6.5% rayon | 0.64 | 0.075 | 0.071 | 0.090 |

The reductions in power factor were to be expected, as a result of the reduced densities brought about by the rayon fibers.

EXAMPLE IV

As a standard of comparison, highly beaten kraft capacitor tissue stock was formed into a sheet having a thickness of 0.00138, a dielectric strength of 559, and a density of 0.80.

EXAMPLE IVa

To the stock of Example IV, rayon staple of 15-denier coarseness, cut to 1/4 inch lengths and deionized, was added in an amount equal to 10%, by weight. The resultant tissue had a thickness of 0.0015 and a dielectric strength of 494, and its density had been reduced to 0.60.

EXAMPLE IVb

The procedure of Example IVa was followed, but the amount of added rayon was 15% instead of 10%. The thickness of the resultant paper was 0.00144 and its density had been reduced to 0.47, but the dielectric strength fell to 337 and the porosity rose to an undesirable extent (0.5 cc. per 15 seconds, measured according to ASTM D-726-58).

EXAMPLE V

As a basis for comparison, a capacitor tissue was formed by usual procedures, employing highly beaten kraft stock, the tissue having a thickness of 0.00069, a dielectric strength of 666, and a density of 0.73.

EXAMPLE Va

To the stock of Example V was added 10% of rayon fibers having a coarseness of 1.5-denier. The rayon was cut to lengths of 1/16 inch and was purified and deionized before use. The tissue produced had a thickness of 0.00077 and a reduced density of 0.63 while its dielectric strength remained at the adequate value of 542.

EXAMPLE Vb

The procedure of Example Va was followed, except that the rayon was added in an amount equal to 15% rather than 10%. The resultant paper had a thickness of 0.00079 and its density was reduced to 0.54, but its porosity rose to an unsatisfactory 0.6 (measured as stated in Example IVb) and its dielectric strength fell to 448.

EXAMPLE VI

The stock used in Example I was given additional beating and formed into capacitor tissue having a thickness of only 0.00041. The density was 0.71. This sheet served as a standard of comparison.

EXAMPLE VIa

The same additionally beaten stock was treated by the addition of polyvinyl formal fibers in an amount equal to 3.5% by weight (dry). The added fibers were ⅛ inch in length and had a coarseness of 1.0 denier. The resultant sheet had a thickness of 0.00042 and a density of only 0.66.

These examples show that the addition of a bulking agent in the form of relatively large-diameter but short-length fibers of innocuous compatible decontaminated fibers can admirably serve to effect a desirable density reduction in capacitor tissue while still maintaining good dielectric properties and low porosity. The porosity in all examples except IVb and Vb was in the acceptable range of 0.1 to 0.3 cc./15 secs. The added fibers should be present in an amount between about 2% and 10%, by weight, and the coarseness should be chosen in the range from about 1.0 to 15 denier, depending upon the thickness of sheet desired.

What is claimed is:

1. A low-density low-porosity dielectric paper, for use between the electrodes of a capacitor, having a density of about 0.59 to 0.70 gram per cubic centimeter, consisting essentially of highly beaten wood pulp fibers and including as a bulking agent relatively large-diameter fibers no more than ¼ inch in length and free of ionic contaminants, the latter fibers being selected from the class consisting of rayon and polyvinyl formal and having diameters approximately the same as the thickness of the paper itself, and the latter fibers being present in an amount between about 2% and 10% of the dry weight of the paper.

2. A paper as defined in claim 1, in which said large-diameter fibers are rayon cut to lengths of about ¹⁄₁₆ to ⅛ inch.

3. A low-density low-porosity capacitor tissue having a thickness in the range of 0.0004 to 0.0015 inch and a density of about 0.59 to 0.70 gram per cubic centimeter, consisting of a major proportion of highly beaten wood pulp fibers and from 2% to 10% of relatively large-diameter rayon fibers about ¹⁄₁₆ to ¼ inch in length, free of ionic contaminants, and randomly uniformly distributed, said large-diameter fibers having a coarseness of from 1.0 to 15 denier, their diameters being approximately the same as the thickness of the tissue itself.

References Cited
UNITED STATES PATENTS

| | | | |
|---|---|---|---|
| 1,850,702 | 3/1932 | Allen | 162—138 |
| 2,208,653 | 7/1940 | Whitehead | 162—146 X |
| 3,093,534 | 6/1963 | Filling | 162—146 |

DONALL H. SYLVESTER, *Primary Examiner.*

HOWARD R. CAINE, *Examiner.*